AMPLITUDE MODULATION COMPRESSING CIRCUIT

Original Filed Oct. 8, 1963 2 Sheets-Sheet 1

INVENTER
PETER AEMMER
BY: McGlew and Toren
ATTORNEYS

AMPLITUDE MODULATION COMPRESSING CIRCUIT

Original Filed Oct. 8, 1963

Inventor:
PETER AEMMER
By: McGlew and Toren
Attorneys

United States Patent Office 3,361,983

Patented Jan. 2, 1968

3,361,983
AMPLITUDE MODULATION COMPRESSING CIRCUIT

Peter Aemmer, Zurich, Switzerland, assignor to Albiswerke Zurich A.G., Zurich, Switzerland Continuation of application Ser. No. 314,737, Oct. 8, 1963. This application May 22, 1967, Ser. No. 640,430
Claims priority, application Switzerland, Oct. 8, 1962, 11,801/62
4 Claims. (Cl. 330—10)

This application is a continuation of Ser. No. 314,737, filed Oct. 8, 1963, now abandoned. This invention relates to amplitude modulation compressor circuits and, more particularly, to an improved circuit of this type in which amplitude modulation compressing is effected with a very insignificant amount of distortion.

In known amplitude modulation compressing circuits, it has been proposed to provide a negative feed-back arrangement for the modulation frequencies so that the output voltage of an amplifier is demodulated with respect to amplitude modulated signals, in order that the thus demodulated voltage may be modulated upon the amplitude modulated signals. In arrangements of this type, an ordinary modulator circuit has been used to effect the subsequent modulation in opposition.

In another known circuit for compressing amplitude modulations, the D.C. and A.C. voltage components of the demodulated signals are applied to a diode connected in parallel with a tuned oscillating circuit. By the resultant action of the diode, the input to a subsequent amplifier is dampened by a value corresponding to the amplitude of the voltage supplied to the diode.

Both of the foregoing arrangements have the disadvantage that the modulations, when compressed thereby, are distorted too greatly for many purposes.

An object of the present invention is to provide an improved circuit for compressing amplitude modulations and in which the compression is effected with a very insignificant amount of distortion.

A further object of the invention is to provide a circuit for compressing amplitude modulations by deriving a D.C. voltage signal from the output of an A.C. current amplifier, and using the derived D.C. voltage signal to provide a negative feed-back.

Still another object of the invention is to provide a circuit such as described in which the D.C. voltage signal is obtained by means of a detector and a low pass filter and is proportional to the amplitude of the A.C. voltage while fluctuating with the modulation.

In further accordance with the invention, compression of the amplitude modulations is effected by virtue of a current source controlled by the feed-back signal. The output current of this current source is an alternating current superposed on an adjustable value of a direct current. The alternating current has the wave shape of the modulation to be compressed, and is in phase opposition thereto. This output current controls one or more diodes whose operating point is determined by the output current. These diodes are the controlled damping elements of a carrier wave amplifier, so that the amplification ratio of the amplifier is proportional to the incremental resistance of the diodes.

For an understanding of the principles of the invention, reference is made to the following description of a typical embodiment thereof as illustrated in the accompanying drawings.

Figure 1:
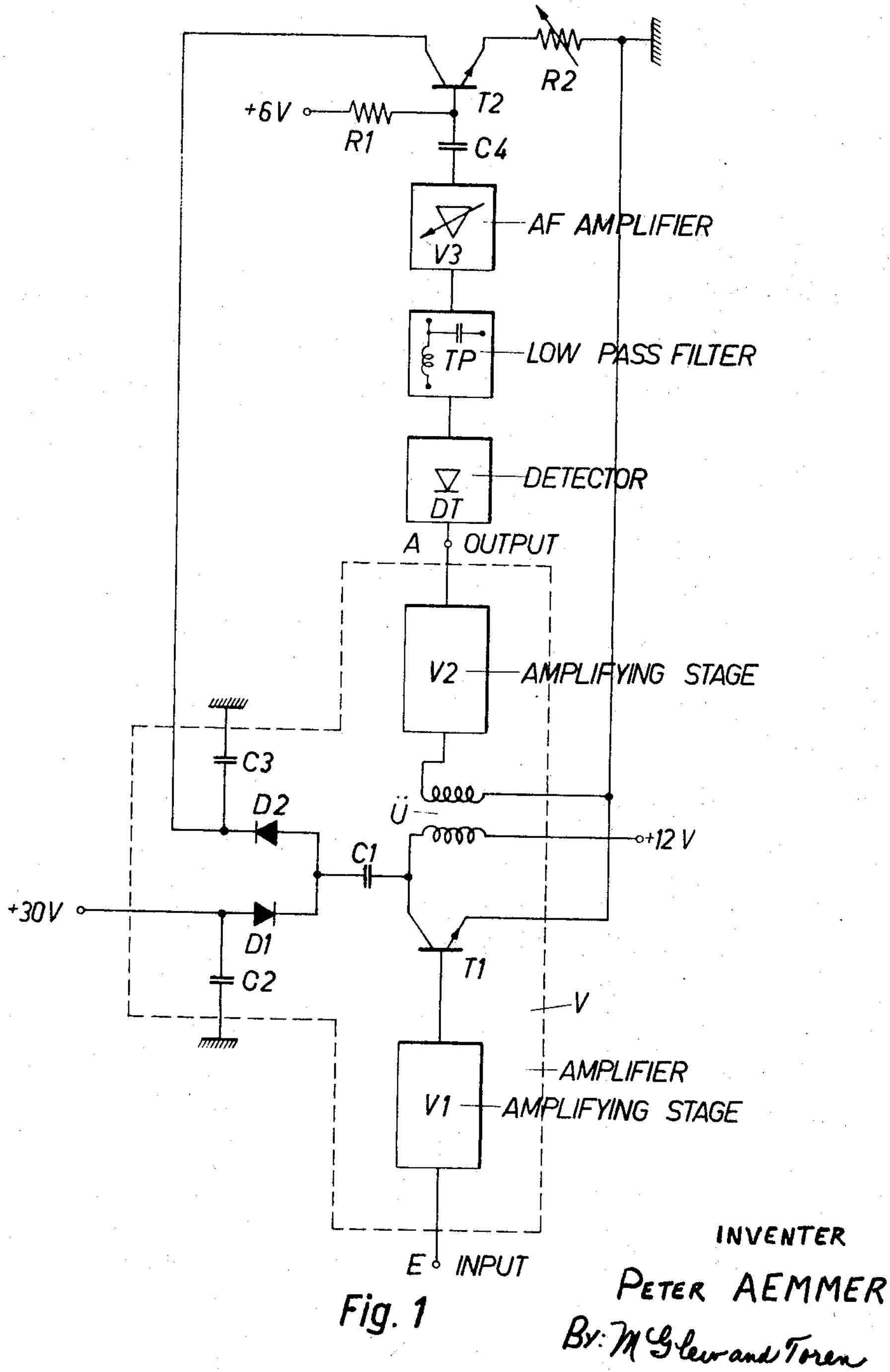
FIG. 1 is a schematic wiring diagram, partly in block form, of one embodiment of an amplitude modulation attenuation circuit in accordance with the invention.

Referring to FIG. 1, the amplitude modulation compressing circuit of the invention comprises an A.C. voltage amplifier V and a counter modulator or modulation in opposition section. Amplifier V is a cascade amplifier circuit including a first amplifier stage V1, a transistor T1, a tuned wide band transformer Ü, and a second amplifier stage V2. A condenser C1 connects the common junction of diodes D1 and D2 to the collector of transistor T1, and one terminal of the primary winding of transformer Ü is also connected to the common junction of the diodes. The emitter of transistor T1 is grounded, while the other terminal of the primary winding of transformer Ü is connected to the positive terminal of a 12-volt source of D.C. potential. One terminal of the secondary winding of transformer Ü is grounded, while the other terminal thereof is connected to the input of amplifier stage V2. The anode terminal of diode D1 is connected to ground through a condenser C2, and the cathode terminal of diode D2 is connected to ground through a condenser C3. The anode terminal of diode D1 is also connected to the positive terminal of a 30-volt source of D.C. potential, and the cathode terminal of diode D2 is connected to the collector of a transistor T2 in the modulator in opposition.

The modulation in opposition section, or counter modulator, comprises a detector DT, a low pass filter TP, a audio frequency amplifier V3 whose amplification ratio can be manually controlled and which has a low ohmic output, a condenser C4 and a second transistor T2, all connected in cascade. Transistor T2 is connected as a negative current feedback device, whereat the transistor base is connected through a resistance R1 to the positive terminal of a 6-volt source of D.C. potential. An adjustable resistance R2 is connected between the emitter of transistor T2 and ground. The input of detector DT is connected to the output of amplifier stage V2.

Transistor T2, acting as a control current source is operated, in the audio modulation compressor of the invention, as a linear element, since the non-linear relation between the base-emitter voltage and the collector current is linearized by emitter resistance R2. The characteristic of the control loop used in the compressor is thus the characteristic of the diodes D1 and D2.

A modulated high frequency signal is applied to the input E of amplifier V. At the output A of amplifier V, the output voltage is derived with a reduced degree of modulation. Detector DT derives a modulation signal, from this output voltage, which modulation signal is proportional to the amplitude of the high frequency carrier. The modulation signal derived by detector DT is applied to the input of the audio frequency amplifier V3 through the low pass filter TP which serves to suppress any residual high frequency components. The output voltage of the audio frequency amplifier V3 is applied, through condenser C4, to the base of transistor T2 which, as has been stated, is connected as a negative current feedback device. Condenser C4 assures that the circuit responds only to the modulation.

The base of transistor T2 is biased by resistance R1 from the +6-volts terminal. The emitter voltage of transistor T2 follows the base voltage. Since the collector current flows through the adjustable resistance R2 in the emitter circuit of transistor T2, the collector current is proportional to the emitter voltage and thus is proportional to the base voltage of transistor T2.

The collector output current of transistor T2 is an alternating current superposed upon a direct current adjustable by means of the adjustable resistance R2. The alternating current has the wave shape of the modulation to be compressed and is in phase opposition to the latter. The collector output current of transistor T2 controls diodes D1 and D2 whose operating point is determined by the direct current. These diodes serve as a controlled loading of transistor T1 in such a manner that the degree of modulation of the high frequency signals to amplifier V is reduced by controlling the high frequency amplification with the rhythm of the modulation.

If it is assumed that the incremental resistance of control diodes D1 and D2 is much smaller than the parallel connected impedance of transformer Ü, which is loaded by the input impedance of amplifier stage V2 and by the collector resistance of transistor T1, the relation between the control current $i$ and the amplification $v$ of the amplifier stage, including the transistor T1, corresponds to the law $$v = v_1 \cdot \frac{i_1}{i}^k$$

wherein $v_1$, $i_1$ and $k$ are constants. The precondition of a high ohmic collector resistance of the transistor T1 may be met with frequencies above 1 mc./s. in a simple manner if transistor T1 is a tetrode transistor. The expression $$\left[\frac{i_1}{i}\right]^k$$

corresponds to the incremental resistance of a crystal diode having flowing therethrough a current which is a function of the current $i$.

With respect to the functioning of the described circuit arrangement, it may be summarized that, at an instantaneous large amplitude of the A.C. voltage in transistor T1, the amplification ratio of amplifier V, in accordance with the conditions then existing in diodes D1 and D2, is reduced by the interaction of the differential resistance and the direct current flowing through these diodes in such a manner that there is a respective predetermined amplification ratio for each instantaneous value of modulation.

Figures 2, 3:
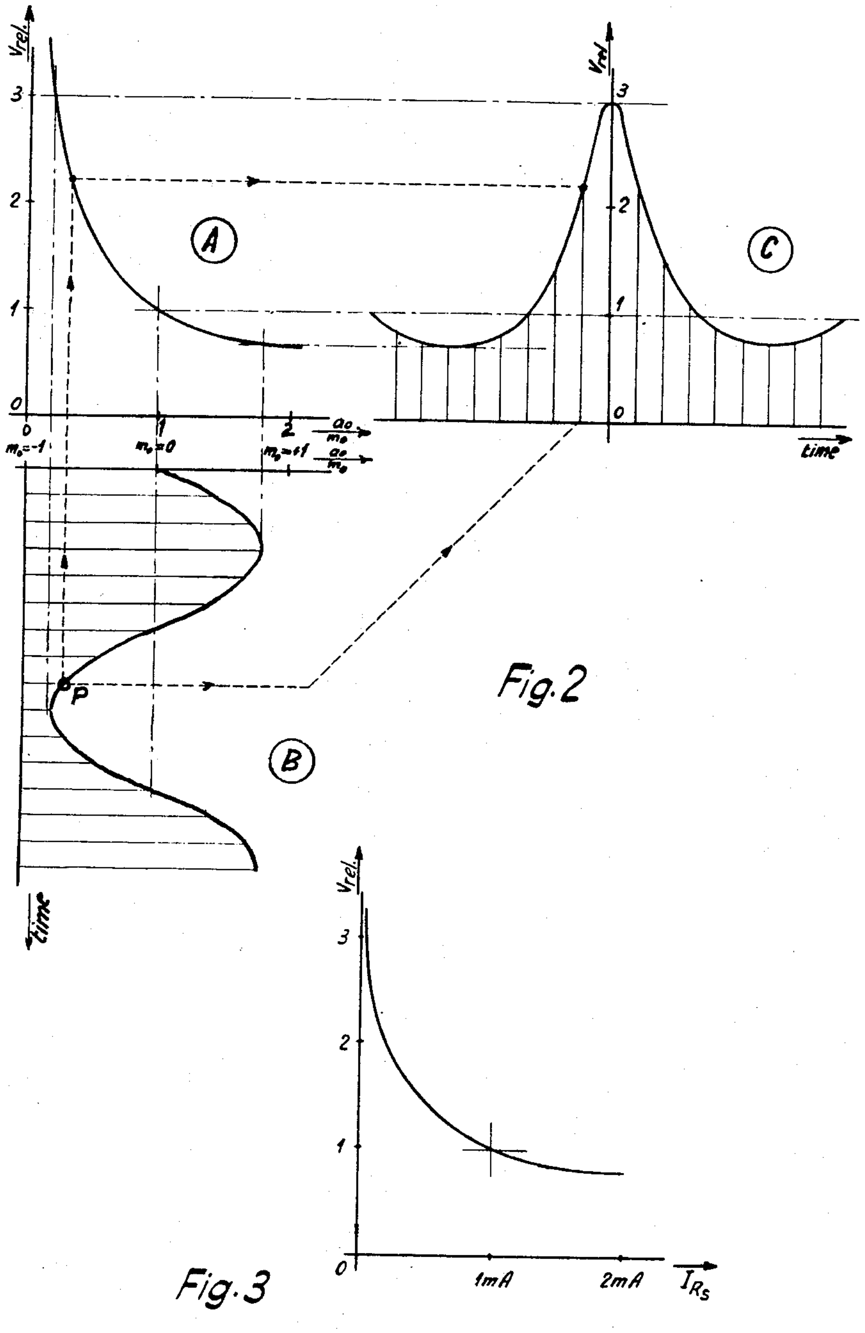
FIG. 2 is a graphical representation illustrating the relation between the relative amplification and the instantaneous values of modulations.
FIG. 3 is a curve of the control characteristic.

By reference to FIG. 2 the characteristic of modulation in opposite for a three-fold modulation compression is shown at A. The ordinate is the relative amplification factor $v_{rel}$. The abscissa is doubly designated namely with the momentary value of the modulation degree $m_o$ and with the momentary amplitude $a_o$. When a sine-modulation of the modulation degree $m=0.8$ (shown at B) has to be compressed, the necessary relative amplification ($v_{rel}$) of the modulation in opposition (shown at C) can be constructed in the following manner: One point P of the sine wave shape at B is projected onto the characteristic curve at A giving the relative amplification factor $v_{rel}$. The intersection point of the time scale and the relative amplification factor in FIG. 2*c* is the point of the amplitude of the modulation in opposition necessary for compressing the amplitude at point P by a factor three.

From FIG. 2*c* it may be determined what the amplification ratio, or relative amplification, must be for each momentary modulation value $m_o$ so that the modulation degree $m$ with, for example, a sine modulation of $m=0.8$ is reduced by a constant factor three. For the mentioned example, a momentary value of $a_o=1.6$ ($m_o=0.6$) has to be attenuated to $a_o=1.2$ ($m_o=0.6/3)=0.2$). This means that the amplification ratio must be $v_{rel}=0.75$. An instantaneous value of $a_o=0.4$ ($m_o=-0.6$) has to be amplified to $a_o=0.8$ ($m_o=-0.2$), or by a factor of 2.0. Thus, the relative amplification $v_{rel}$, in accordance with the instantaneous values of the momentary modulation degree $m_o$, must be a very nonlinear characteristic in order to obtain an exact and constant degree of modulation compression, as seen in FIG. 2. If this curve representing the ratio between $v_{rel}$ and modulation ($m_o$) is compared with the characteristic of FIG. 3, in which the control characteristic in the vicinity of, for example, $i_R=1mA$ in a linear scale (see the formula for $v$), it will be noted that the two curves are similar although both curves correspond to different mathematical laws. Therefore, one can approximate the modulation in opposition characteristic by superimposing, upon the control value in the neighborhood of a predetermined static current such as, for example, $1mA$, an alternating current which has the wave shape of the modulation to be compressed and which is in phase opposition to such modulation.

A sine modulation thus maintains its form after such counter control with a sine wave current, and changes only in the degree of modulation. With a pure modulation in opposition which is out of phase, for example, if there is a phase shift of too great a value in the low pass filter TP, then under certain circumstances, substantial distortions may take place. By changing the amplification ratio in the counter modulator or modulation in opposition section, the desired degree of compression can be readily adjusted. For a constant compression factor, it is necessary only that the relation $i/i_o$ remains constant. In this ratio, $i_o$ is the basic current and $i$ is the alternating current to be superimposed for a predetermined modulation.

While a specific embodiment of the invention has been shown and described in detail to illustrate the application of the principles of the invention, it will be understood that the invention may be embodied otherwise without departing from such principles.

What is claimed is:

1. Means for compressing amplitude modulated carrier signals comprising, in combination, multi-stage carrier wave amplifier means including a transformer coupling successive stages and connected to a source of B+ potential; means applying the carrier signal to be compressed to the input of said amplifier means; detector means connected, in opposition, to the output of said amplifier means and generating a pulsating unidirectional voltage corresponding to the modulating signal; a transistor having a base, an emitter and a collector; a base-emitter circuit for said transistor connected between opposite terminals of a first source of D.C. potential; means applying said unidirectional voltage to said base; means decoupling said first source from said detector means; a collector-emitter circuit for said transistor connected between opposite terminals of a second source of D.C. potential and including, in series, a pair of diodes having respective terminals of opposite polarity interconnected at a common junction point, said collector, said emitter and an adjustable resistance connected between said emitter and an adjustable resistance connected between said emitter and one terminal of said second source; said adjustable resistance serving to adjust the collector current to a range in which the generally non-linear relation between the base-emitter voltage and the collector current is linear; the collector current comprising a pulsating unidirectional current, dependent on said unidirectional voltage, and having the wave shape of, and in phase opposition to, the amplitude modulation, superimposed upon the adjustable D.C. emitter-collector current; a capacitor coupling a winding of said transformer to said common junction point of said diodes, whereby said diodes act as controlled damping elements of said carrier wave amplifier means; and capacitor means connecting the other terminals of said diodes to ground so that said diodes are connected in parallel with each other and said second source of D.C. potential is decoupled from said carrier wave amplifier means; the collector current controlling the working point, and thus the incremental resistance, of said diodes, acting as controlled damping elements of said carrier wave amplifier means, as a function of said modulating signal.

2. Means for compressing amplitude modulated carrier signals, as claimed in claim 1, in which said capacitor is connected to the primary winding of said transformer.

3. Means for compressing amplitude modulated carrier signals, as claimed in claim 1, including a second transistor in said multi-stage carrier wave amplifier means; said second transistor having its base connected to the output of the first stage of said amplifier means and its collector connected to one terminal of the primary winding of said transformer; the secondary winding of said transformer; the secondary winding of said transformer being connected to the input of the output stage of said amplifier; said capacitor being connected to the junction of the collector of said second transistor and said primary winding, and said source of B+ potential being connected to the other terminal of said primary winding.

4. Means for compressing amplitude modulated carrier signals, as claimed in claim 3, in which said two transistors are NPN transistors.

No References Cited.

ROY LAKE, *Primary Examiner.*

N. KAUFMAN, *Assistant Examiner.*